United States Patent [19]
Estelle

[11] Patent Number: 5,875,059
[45] Date of Patent: Feb. 23, 1999

[54] VARIABLE FOCAL LENGTH LENS SYSTEM HAVING A DIVERGENT FRONT LENS UNIT

[75] Inventor: Lee Roy Estelle, Rochester, N.Y.

[73] Assignee: Eastman Kodak Company, Rochester, N.Y.

[21] Appl. No.: 801,373

[22] Filed: Feb. 19, 1997

[51] Int. Cl.⁶ .............. G02B 15/14; G02B 3/02; G02B 13/06; G02B 9/04
[52] U.S. Cl. .............. 359/682; 359/691; 359/717; 359/725; 359/740; 359/742; 359/753; 359/793
[58] Field of Search .............. 359/682, 691, 359/717, 740, 742, 753, 725, 793

[56] References Cited

U.S. PATENT DOCUMENTS

| | | | |
|---|---|---|---|
| 3,466,113 | 9/1969 | Bertele | 350/423 |
| 3,942,874 | 3/1976 | Besenmatter et al. | 350/184 |
| 4,099,844 | 7/1978 | Bertele | 350/184 |
| 4,203,653 | 5/1980 | Mori | 359/753 |
| 4,585,314 | 4/1986 | Tateoka | 350/464 |
| 4,856,880 | 8/1989 | Ohshita | 359/753 |
| 5,278,698 | 1/1994 | Iizuka et al. | 359/651 |
| 5,315,441 | 5/1994 | Hori et al. | 359/753 |
| 5,710,670 | 1/1998 | Ohno | 359/691 |
| 5,745,303 | 4/1998 | Ohno | 359/691 |
| 5,768,030 | 6/1998 | Estelle et al. | 359/691 |
| 5,774,279 | 6/1998 | Kiriki et al. | 359/753 |

OTHER PUBLICATIONS

Ellis Betensky, "Zoom lenses for small CCD cameras", SPIE vol. 2539, pp. 2–10, Jun. 1995.

Primary Examiner—Georgia Epps
Assistant Examiner—Evelyn A. Lester
Attorney, Agent, or Firm—Svetlana Z. Short

[57] ABSTRACT

Variable focal length lens system comprises two adjacent lens units, one stationary, the other movable. These lens units are in order from an object side towards an image side (i) A first lens unit possessing divergent refractive power. The first lens unit is the front most lens unit. It consists of a single negative lens component.

(ii) A second lens unit possessing convergent refractive power. The second lens unit, includes at least two positive power lens components and an aperture stop.

33 Claims, 15 Drawing Sheets

VARIABLE FOCAL LENGTH LENS SYSTEM HAVING A DIVERGENT FRONT LENS UNIT

BACKGROUND OF THE INVENTION

1. Field of the Invention

This invention relates to variable focal length lens systems consisting of a first lens unit possessing divergent refractive power and a movable second lens unit possessing convergent refractive power.

2. Description of the Prior Art

Variable focal length lens systems having a first divergent lens unit and a second convergent lens units are known. Such lens systems are disclosed in U.S. Pat. Nos. 4,099,844; 3,942,874 and 3,466,113. However, these lens system have an additional, third lens unit. These additional lens units increase the complexity and the cost of these lens systems. Each of these lens systems has six lens elements.

U.S. Pat. No. 4,585,314 discloses a verifocal lens system with a stationary first unit having divergent refractive power and a movable second unit possessing convergent refractive power. This lens system also comprises six lens elements. In addition this lens system is unfit for use as a taking lens (an objective lens) in a camera because it accepts a maximum full field angle of only 38 degrees.

U.S. Pat. No. 5,278,698 discloses magnifying projecting lens systems, some of which having a variable focal length. More specifically, the lens systems of embodiments 17–21 consist of a negative first lens unit (referred to as a negative first lens group), a positive second lens unit (referred to as a positive second lens group) and, a positive third lens unit (referred to as a positive third lens group). Although some of the embodiments have as few as four lens elements (see embodiment 19), all three of the lens units move in order to provide a variable focal length system. The patent states (col. 9, lns. 67,68 and col. 10, ln. 1) that "The focal length is changed by changing a distance between the second lens group and the third lens group and by moving the whole [lens] system." Finally, these lens systems accept a field angle of only 50 degrees, have an F-number of F/4.8 to F/5.9, and have a zoom ratio of only 1.5.

Further need exists for a simple variable focal length (verifocal) lens system that has only one zooming lens unit, accepts a field angle of at least 60 degrees, provides larger numerical apertures and is capable of zoom ratios over 1.5, and that also has a small number of lens elements.

SUMMARY OF THE INVENTION

It is an object of the present invention desirable to achieve a variable focal length lens system that has only one zooming lens unit, accepts a field angle of at least 60 degrees, has relatively large numerical aperture (small F/number), has a zoom ratio of over 1.5 and has a small number of lens elements.

According to the present invention, a variable focal length lens system comprises two adjacent lens units, one stationary, the other movable. These lens units are in order from an object side towards an image side (i) A first lens unit possessing divergent refractive power. The first lens unit is the front most lens unit. It consists of a single negative lens component.

(ii) A second lens unit possessing convergent refractive power. The second lens unit includes at least two positive power lens components and an aperture stop.

According to a preferred embodiment of the present invention the first lens unit is stationary, the second lens unit is movable, and the aperture stop is located between the two positive lens components of the second lens unit.

Also according to a preferred embodiment of the present invention the single negative lens component of the first lens unit has an aspheric surface and has a V number greater than 50.

DESCRIPTION OF THE PREFERRED EMBODIMENT

Figure 1A:
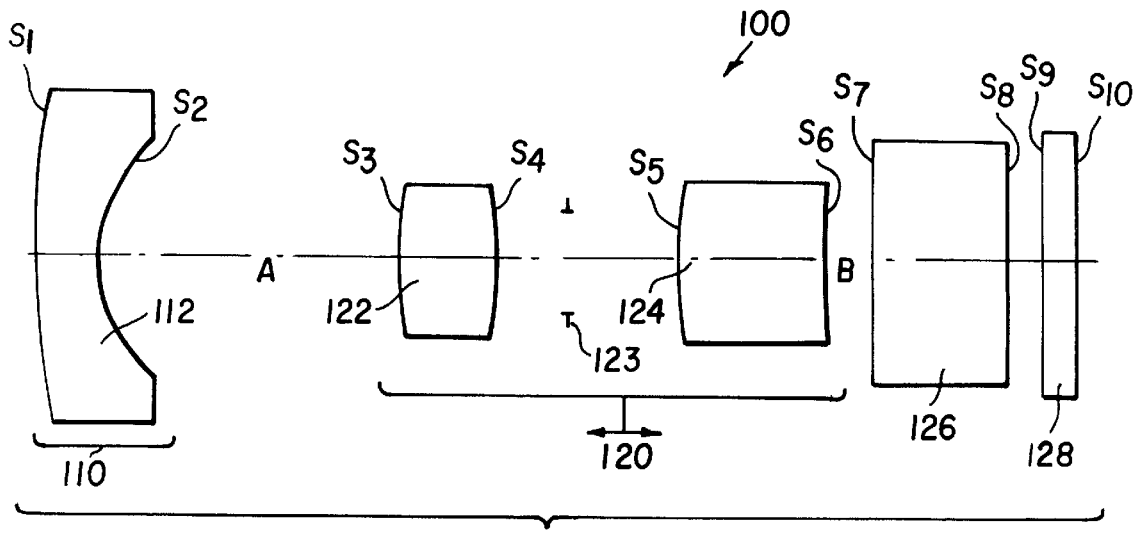
FIG. 1A is a sectional view of a first embodiment of the lens system according to the present invention.
Figure 1B:
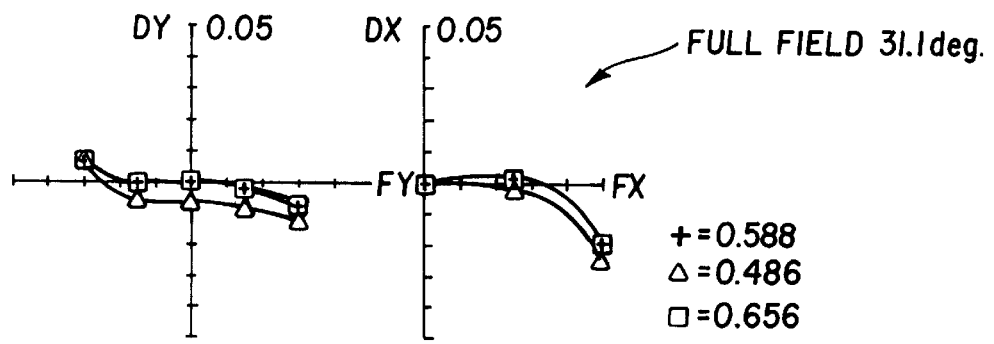
FIGS. 1B–1E are graphical illustrations of the aberrations of the lens system illustrated in FIG. 1A in a wide angle position.
Figure 1C:
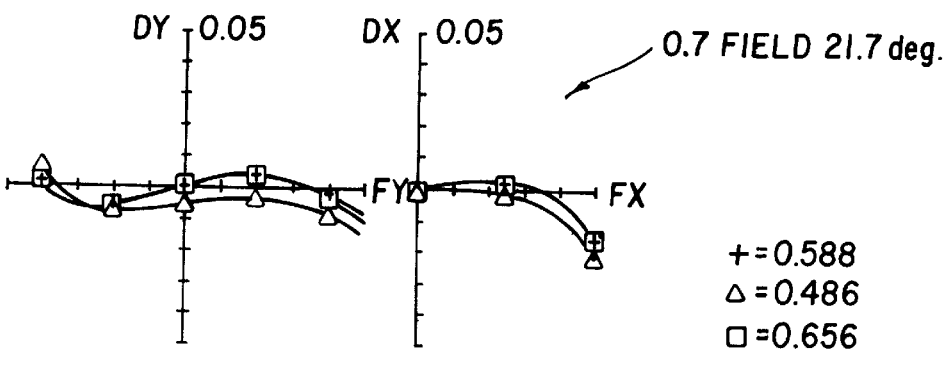
Figure 1D:
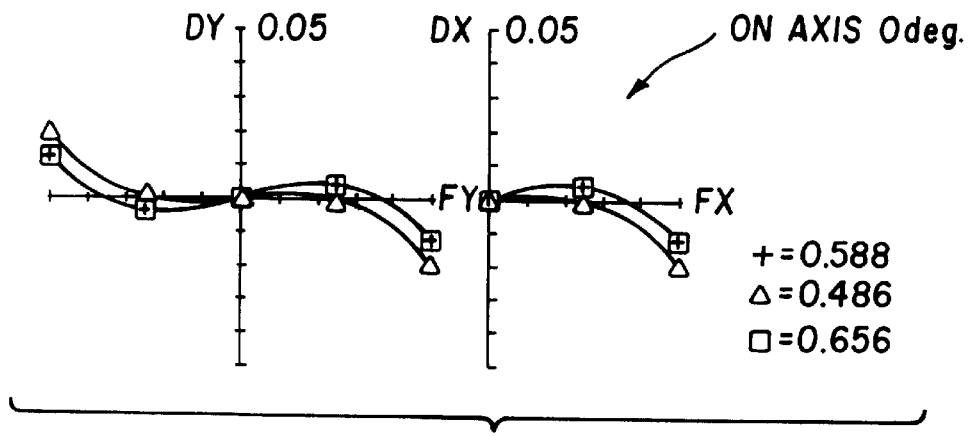

The preferred embodiments of the variable focal length lens system according to the present invention will be described concretely in the form of numerical data (provided in tables 1A, 2A, 3A, 4A and 5A for surfaces S1–S7 or S–S8) with reference to the accompanying drawings.

TABLE 1A

| SURF | RADIUS | THICKNESS | INDEX | V# |
|---|---|---|---|---|
| S1 | ASPHERE | 1.400 | 1.60 | 60.6 |
| S2 | 3.393 | A | | |
| S3 | ASPHERE | 2.211 | 1.60 | 60.6 |
| S4 | ASPHERE | 1.531 | | |
| | DIAPHRAGM | 2.449 | | |
| S5 | DIFFRACTIVE | 3.269 | 1.51 | 64.1 |
| S6 | ASPHERE | B | | |
| S7 | PLANO | 3.020 | 1.54 | 70.1 |

TABLE 1A-continued

| S8  | PLANO | 0.729 |      |      |
|-----|-------|-------|------|------|
| S9  | PLANO | 0.762 | 1.53 | 61.3 |
| S10 | PLANO |       |      |      |

| EF | BF | FF | A | B | F/NO |
|---|---|---|---|---|---|
| 5.15 | 5.07 | -2.47 | 6.494 | 0.944 | 4.01 |
| 8.47 | 8.23 | 1.03 | 3.107 | 4.332 | 5.32 |

| EF | LENS LENGTH | STOP DIAM | REL APER | IMAGE DISTANCE | BEST FOCUS |
|---|---|---|---|---|---|
| 5.15 | 17.354 | 2.25 | 4.01 | .947 | -.153 |
| 8.47 | 13.967 | 2.25 | 5.32 | .721 | .073 |

Aspheric Surface $X = \dfrac{CY^2}{1 + \sqrt{1 - C^2Y^2}} + DY^4 + EY^6 + FY^8 + GY^{10}$ SURF. S1  $C = 0.0435$  $D = 0.40700E-03$  $F = 0.55300E-06$
          $E = -0.81618E-05$  $G = 0.00000E+00$
SURF. S3  $C = 0.1191$  $D = 0.15500E-03$  $F = 0.12300E-03$
          $E = 0.31200E-03$  $G = -0.15079E-04$
SURF. S4  $C = -0.1191$  $D = -0.15500E-03$  $F = 0.12300E-03$
          $E = 0.31200E-03$  $G = 0.15079E-04$
SURF. S6  $C = 0.0175$  $D = 0.35360E-02$  $F = 0.00000E+00$
          $E = 0.00000E+00$  $G = 0.00000E+00$

THE DIFFRACTIVE SURFACE IS DESCRIBED BY THE FOLLOWING:

PHASE EQUATION: $\Phi(Y) = \dfrac{2\pi}{\lambda_0} (C_1 y^2 + C_2 y^4 + C_3 y^6)$ SURF. S5  $C_1 = -3.484E-03$  $C_2 = -7.08E-04$  $C_3 = 6.9372E-05$
$\lambda_0 = 587.6$ NM

TABLE 1B

BEST MTF USING WAVELENGTHS 550, 450, AND 656.3 WITH WEIGHTS .5, .15, .35 RESPECTIVELY AT 34L/MM. (SAGITTAL/TANGENTIAL)

| | | PERCENT FIELD | | | | | |
|---|---|---|---|---|---|---|---|
| EF($\lambda = 588$) | AXIS | 40 | 60 | 75 | 90 | AWA* | 100 |
| 5.15 | 75 | 74/70 | 73/65 | 74/63 | 75/63 | 70 | 73/53 |
| 8.47 | 74 | 73/71 | 72/68 | 70/65 | 68/61 | 70 | 65/56 |

*AWA = area weighted average

TABLE 2A

| SURF | CLEAR APER. | RADIUS | THICKNESS | INDEX | V# |
|---|---|---|---|---|---|
| S1 | 6.91 | ASPHERE | 1.400 | 1.62 | 60.3 |
| S2 | 5.09 | 3.714 | A | | |
| S3 | 3.40* | 6.993 | 1.635 | 1.80 | 46.5 |
| S4 | 3.12 | -25.5760 | 2.407 | | |
|    | 2.02 | DIAPHRAGM | 1.111 | | |
| S5 | 2.49 | ASPHERE | 0.900 | 1.84 | 23.8 |
| S6 | 2.77 | 6.287 | 2.493 | 1.62 | 53.1 |
| S7 | 3.54* | -6.287 | B | | |
| S8 | 5.03 | PLANO | 3.020 | 1.54 | 70.1 |
| S9 | 5.50 | PLANO | 0.729 | | |
| S10 | 5.67 | PLANO | 0.762 | 1.53 | 61.3 |
| S11 | 5.79 | PLANO | | | |

*DO NOT EXCEED

| EF | BF | FF | A | B | F/NO |
|---|---|---|---|---|---|
| 5.14 | 6.32 | -2.86 | 6.491 | 2.258 | 4.01 |
| 8.46 | 9.81 | 0.30 | 2.805 | 5.944 | 5.29 |

TABLE 2A-continued

| EF | LENS LENGTH | STOP DIAM | REL APER | IMAGE DISTANCE | BEST FOCUS |
|---|---|---|---|---|---|
| 5.14 | 16.437 | 2.00 | 4.01 | .880 | -.086 |
| 8.46 | 12.751 | 2.02 | 5.29 | .699 | .095 |

ALL LINEAR DIMENSIONS ARE IN MILLIMETERS

Aspheric Surface $X = \dfrac{CY^2}{1 + \sqrt{1 - C^2Y^2}} + DY^4 + EY^6 + FY^8 + GY^{10}$ SURF. S1  $C = 0.02602$  $D = 0.57400E-03$  $F = 0.58848E-06$
          $R = 1/C = 38.436$  $E = -0.1315300E-04$
SURF. S5  $C = -0.00964$  $D = -0.16940E-02$  $F = 0.00E+00$
          $R = 1/C = -103.762$  $E = 0.00E+00$

TABLE 2B

BEST MTF USING WAVELENGTHS 550, 450, AND 656.3 WITH WEIGHTS .5, .15, .35 RESPECTIVELY AT 34L/MM. (SAGITTAL/TANGENTIAL)

| | | PERCENT FIELD | | | | |
|---|---|---|---|---|---|---|
| EF($\lambda = 580$) | AXIS | 40 | 60 | 75 | 90 | 100 |
| 5.14 | 71 | 71/72 | 70/71 | 69/68 | 65/69 | 62/62 |
| 8.46 | 80 | 80/79 | 78/74 | 73/70 | 64/62 | 55/55 |

TABLE 3A

| SURF | CLEAR APER | RADIUS | THICKNESS | INDEX | V# |
|---|---|---|---|---|---|
| S1 | 7.18 | ASPHERE | 1.400 | 1.62 | 60.3 |
| S2 | 5.07 | 3.393 | A | | |
| S3 | 3.32 | ASPHERE | 1.597 | 1.80 | 46.5 |
| S4 | 3.14 | ASPHERE | 2.347 | | |
|    | 1.96 | DIAPHRAGM | 0.458 | | |
| S5 | 2.16 | 43.282 | 0.930 | 1.78 | 2.61 |
| S6 | 2.40 | 3.804 | 0.098 | | |
| S7 | 2.48 | 4.665 | 2.680 | 1.51 | 64.1 |
| S8 | 3.44 | -4.665 | B | | |
| S9 | 5.04 | PLANO | 3.020 | 1.54 | 70.1 |
| S10 | 5.54 | PLANO | 0.729 | | |
| S11 | 5.72 | PLANO | 0.762 | 1.53 | 61.3 |
| S12 | 5.85 | PLANO | | | |

| EF | BF | FF | A | B | F/NO |
|---|---|---|---|---|---|
| 4.60 | 6.41 | -3.00 | 6.840 | 2.350 | 4.01 |
| 7.56 | 9.75 | -0.39 | 3.256 | 5.933 | 5.29 |

| EF | LENS LENGTH | STOP DIAM | REL APER |
|---|---|---|---|
| 4.60 | 16.350 | 1.96 | 4.00 |
| 7.56 | 12.766 | 1.96 | 5.29 |

ALL LINEAR DIMENSIONS ARE IN MILLIMETERS

Aspheric Surface $X = \dfrac{CY^2}{1 + \sqrt{1 - C^2Y^2}} + DY^4 + EY^6 + FY^8$

SURF. S1  $C = 0.02460$  $D = 0.6750E-03$  $F = 0.0000E+00$
          $E = 0.2210E-05$
SURF. S3  $C = 0.10131$  $D = -0.3640E-03$  $F = -0.1070E-05$
          $E = 0.2664E-04$
          $F = -0.1070E-05$

TABLE 3A-continued

SURF. S4  C = -0.10131   D = 0.3640E - 03   F = 0.1070E - 05
                          E = -0.2664E - 04

TABLE 3B

MTF PERFORMANCE DATA (at 34 L/mm)

|  |  | PERCENT FIELD | | | | |
|---|---|---|---|---|---|---|
| EF(λ = 588) | AXIS | 40 | 60 | 75 | 90 | 100 |
| 4.60 | 79 | 76/76 | 75/79 | 75/77 | 75/73 | 77/70 |
| 7.57 | 79 | 77/76 | 75/71 | 72/68 | 69/64 | 64/56 |

TABLE 4A

| SURF | CLEAR APER | RADIUS | THICKNESS | INDEX | V# |
|---|---|---|---|---|---|
| S1 | 7.18 | ASPHERE | 1.400 | 1.62 | 60.3 |
| S2 | 5.04 | 3.327 | A | | |
| S3 | 3.32 | ASPHERE | 1.591 | 1.80 | 46.5 |
| S4 | 3.14 | ASPHERE | 2.236 | | |
|  | 1.97 | DIAPHRAGM | 0.485 | | |
| S5 | 2.13 | 65.666 | 0.930 | 1.78 | 26.1 |
| S6 | 2.38 | 3.773 | 0.098 | | |
| S7 | 2.47 | 4.550 | 2.730 | 1.51 | 64.2 |
| S8 | 3.44* | -4.550 | B | | |
| S9 | 5.04 | PLANO | 3.020 | 1.54 | 70.1 |
| S10 | 5.53 | PLANO | 0.729 | | |
| S11 | 5.71 | PLANO | 0.762 | 1.53 | 61.3 |
| S12 | 5.84 | PLANO | | | |

*DO NOT EXCEED

| EF | BF | FF | A | B | F/NO |
|---|---|---|---|---|---|
| 4.60 | 6.51 | -3.02 | 6.785 | 2.448 | 4.00 |
| 7.57 | 9.89 | -0.41 | 3.196 | 6.035 | 5.29 |

| EF | LENS LENGTH | STOP DIAM | REL APER | IMAGE DISTANCE | BEST FOCUS |
|---|---|---|---|---|---|
| 4.60 | 16.255 | 1.97 | 4.00 | .883 | -.089 |
| 7.57 | 12.666 | 1.96 | 5.29 | .671 | .123 |

$$\text{Aspheric Surface } X = \frac{CY^2}{1 + \sqrt{1 - C^2Y^2}} + DY^4 + EY^6 + FY^8$$

SURF. S1  C = 0.02872  D = 0.6841735E - 03   F = 0.00000E + 00
                        E = -0.1554377E - 05
SURF. S3  C = 0.1021   D = -0.3229992E - 03  F = -0.3626567E - 07
                        E = 0.1919266E - 04
SURF. S4  C = 0.1021   D = 0.3229992E - 03   F = 0.3626567E - 07
                        E = -0.1919266E - 04

TABLE 4B

|  |  | PERCENT FIELD | | | | |
|---|---|---|---|---|---|---|
| EF(λ = 588) | AXIS | 40 | 60 | 75 | 90 | 100 |
| 4.60 | 79 | 76/76 | 75/79 | 75/77 | 75/73 | 77/70 |
| 7.57 | 79 | 77/76 | 75/71 | 72/68 | 69/64 | 64/56 |

TABLE 5A

| SURF | CLEAR APER. | AXIAL BEAM | RADIUS | THICKNESS | INDEX | V# |
|---|---|---|---|---|---|---|
| S1 | 6.75 | 1.61 | ASPHERE | 1.400 | 1.62 | 60.3 |
| S2 | 4.95 | 1.57 | 3.587 | A | | |
| S3 | 3.30* | 2.48 | ASPHERE | 1.630 | 1.80 | 46.5 |
| S4 | 3.13 | 2.49 | ASPHERE | 2.291 | | |
|  | 2.05 | 2.05 | DIAPHRAGM | 1.000 | | |
| S5 | 2.40 | 1.95 | 48.824 | 1.000 | 1.85 | 28.8 |
| S6 | 2.65 | 1.88 | 4.709 | 0.098 | | |
| S7 | 2.71 | 1.90 | 6.0195 | 2.592 | 1.62 | 53.2 |
| S8 | 3.54 | 1.92 | -6.0195 | B | | |
| S9 | 5.06 | 1.00 | PLANO | 3.020 | 1.54 | 70.1 |
| S10 | 5.52 | 0.51 | PLANO | 0.729 | | |
| S11 | 5.70 | 0.32 | PLANO | 0.762 | 1.53 | 61.3 |
| S12 | 5.82 | 0.19 | PLANO | | | |

| EF | BF | FF | A | B | F/NO |
|---|---|---|---|---|---|
| 5.15 | 6.48 | -2.89 | 6.341 | 2.356 | 4.01 |
| 8.51 | 9.97 | 0.36 | 2.617 | 6.080 | 5.29 |

| EF | LENS LENGTH | STOP DIAM | REL APER | IMAGE DISTANCE | BEST FOCUS |
|---|---|---|---|---|---|
| 5.15 | 16.352 | 2.05 | 4.01 | .945 | -.151 |
| 8.51 | 12.628 | 2.05 | 5.29 | .706 | .088 |

$$\text{Aspheric Surface } X = \frac{CY^2}{1 + \sqrt{1 - C^2Y^2}} + DY^4 + EY^6 + FY^8$$

SURF. S1  C = 0.0357   D = 0.44500E - 03    F = 0.67000E - 06
                        E = -0.12250E - 04   G = 0.00000E + 00
SURF. S3  C = 0.09416  D = 0.15781E - 03    F = 0.10320E - 03
                        E = 0.1919266E - 04  G = -0.11730E - 04
SURF. S4  C = -0.9416  D = -0.15781E - 03   F = -0.10320E - 03
                        E = 0.288500 - 03    G = 0.11730E - 04

TABLE 5B

BEST MTF USING WAVELENGTHS 550, 450, AND 656.3 WITH
WEIGHTS .5, .15, .35 RESPECTIVELY AT 34L/MM.
(SAGITTAL/TANGENTIAL)

|  |  | PERCENT FIELD | | | | |
|---|---|---|---|---|---|---|
| EF(λ = 588) | AXIS | 40 | 60 | 75 | 90 | 100 |
| 5.15 | 75 | 75/74 | 74/74 | 74/74 | 72/75 | 71/68 |
| 8.51 | 77 | 74/70 | 70/64 | 67/62 | 62/59 | 57/55 |

The variable focal length lens system (100) of a first embodiment is illustrated in FIG. 1A and its parameters are provided in Table 1A. Table 1B provides its performance characteristics in terms of MTF (Modulation Transfer Function) response. The variable focal length lens system (100) of the first embodiment consists of two adjacent lens units (110 and 120). The term "adjacent" for purposes of this specification means the absence of anything of the same kind in between. Thus the term "adjacent lens units" means that there are no other lens units in between the two lens units. These two lens units, in order from an object side towards an image side, are (i) a first lens unit (110) possessing divergent refractive power and (ii) a second lens unit (120) possessing convergent refractive power. The airspace A between these two lens units changes during zooming.

The first lens unit (110) is the front most lens unit and consist of a single negative lens component (112). This lens component (112) is a single meniscus lens element concave towards the image side. It has an aspheric object facing surface S1 that helps minimize distortion. It is made of low dispersion glass (a glass with a V number>50). It is even more preferred for a V-number to be greater than 55. It is even better for the V-number to be greater than 58 and it is most preferred for it to be over 60. This helps to control lateral color aberration and eliminates the need for a positive power lens component in the first lens unit.

The second lens unit (120) includes at least two positive power lens components (122 and 124) and an aperture stop (123) located therebetween. The first lens component (122) of the second lens unit is a positive single biconvex lens element. It is equiconvex (i.e., both surfaces have the same radii of curvature). This component is also biaspheric. Both aspheric surfaces of the lens component 122 have the same aspheric surface profile and are described by the same aspheric surface equation. (See Table 1A.) Thus, this lens component is symmetric (front-to-back). Because both surfaces (S3 and S4) of the first lens component (122) are identical, they can be made with the same tools. In addition, because both sides of this lens component are identical, during the assembly process, the orientation of the this lens component with respect to other lens components of the lens system is not an issue. That is, one does not have to worry which is the front surface and which is the back surface of this lens component (122). Thus, a verifocal lens incorporating such lens components is less expensive to manufacture.

The second lens component (124) of the second lens unit is a positive lens component. It has a diffractive object (front) facing surface S5 and an aspheric image (rear) facing surface S6. The diffractive surface is used to correct the color aberration of the lens system and renders the lens system (F-C) achromatic. Using the diffractive surface in the second lens unit eliminated the need for a color correcting negative lens element and allowed the two positive lens components (122 and 124) of the second lens unit (120) to perform as a triplet equivalent. This allowed the lens system (100) to achieve a wide angle (full) field coverage of about 62 degrees, a zoom ratio of 1.65 and the F-numbers of F/4.0–F/5.3 with a total of only three lens elements and with only one zooming lens unit.

It is noted that planar transparent elements 126, 128 shown in FIG. 1A represent a filter and a cover glass. These elements have no optical refractive power and are needed because of the specific optical system requirements. Although the presence of these elements 126, 128 was taking into account in designing the lens system 100, a similar lens system design can be easily produced without incorporating these lens elements.

Figure 1E:
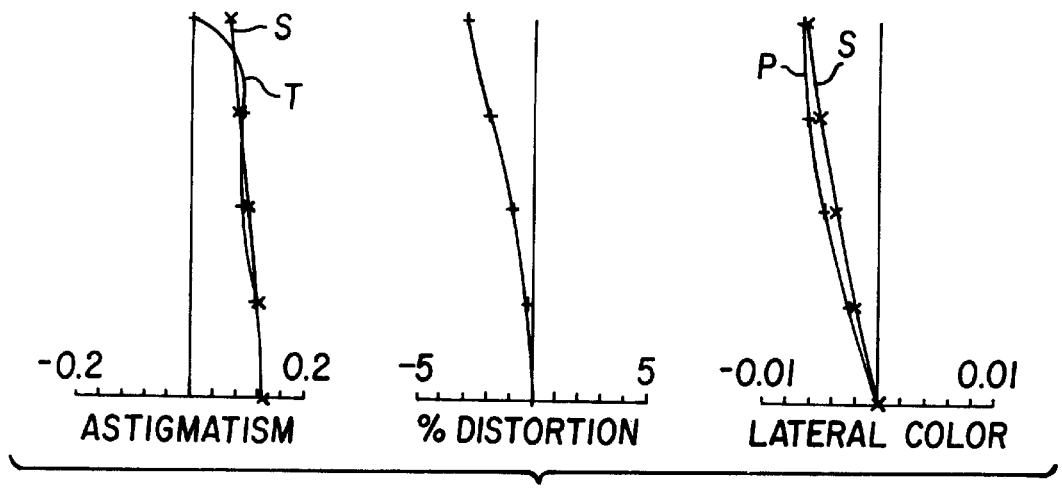
Figure 1F:
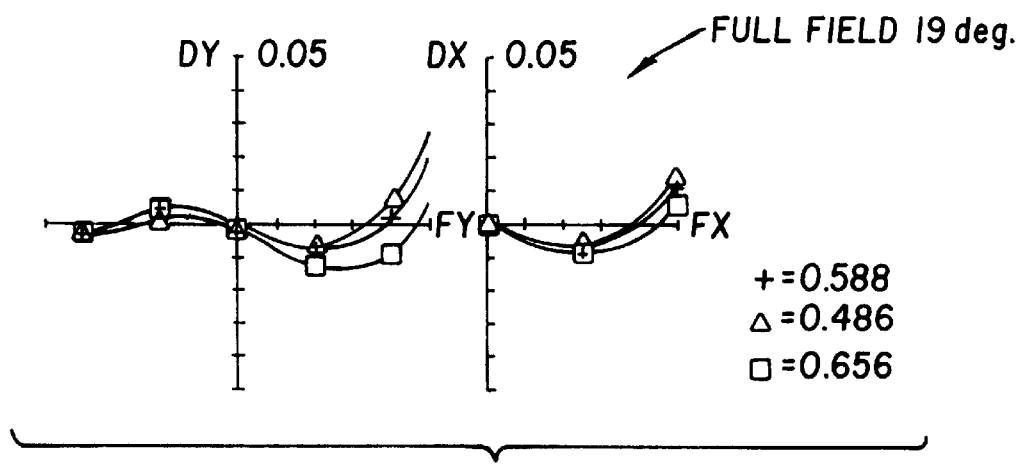
FIGS. 1F–1I are graphical aberrations of the lens system illustrated in FIG. 1A in a telephoto position.
Figure 1G:
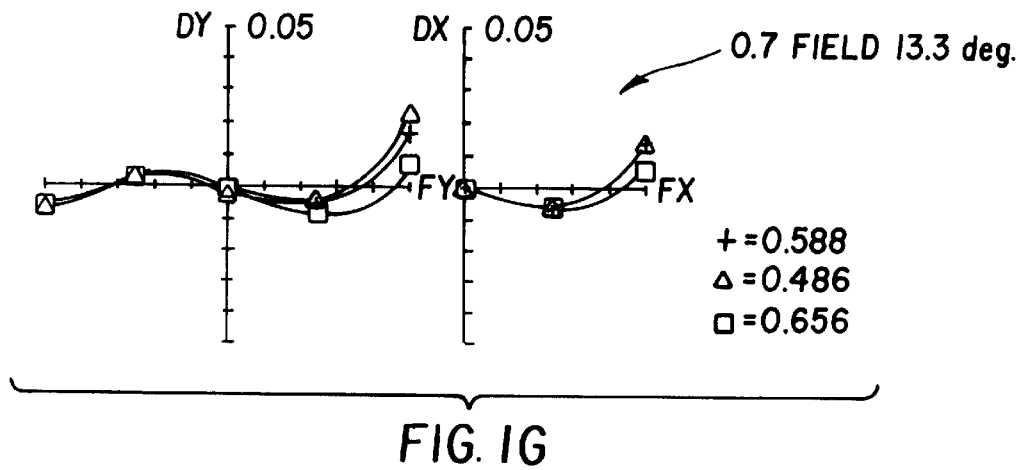
Figure 1H:
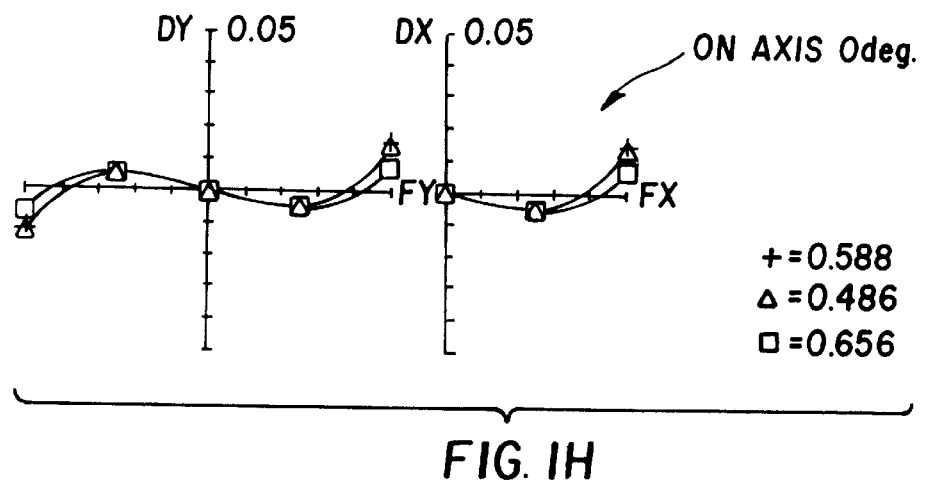
Figure 1I:
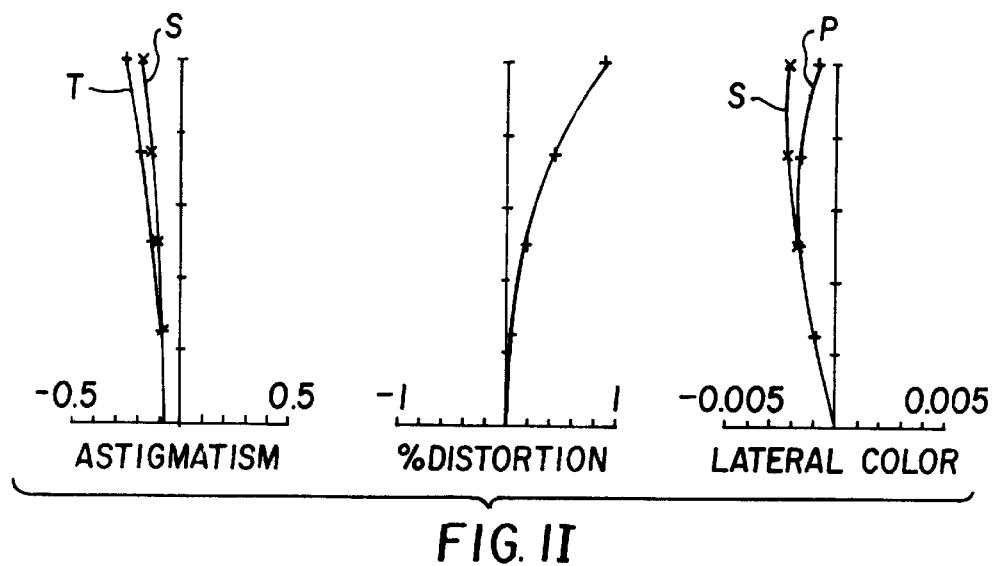

FIGS. 1B–1E and 1F–1I detail the performance of the variable lens system 100 in the wide angle and the telephoto positions, respectively. More specifically FIGS. 1B–1D and FIGS. 1F–1H provide ray intercept curves for various field positions (0.0, 0.7 and full field). FIGS. 1E and 1I represent astigmatism, distortion and lateral color, when the lens system 100 are operating in the wide angle and the telephoto positions, respectively.

Figure 2A:
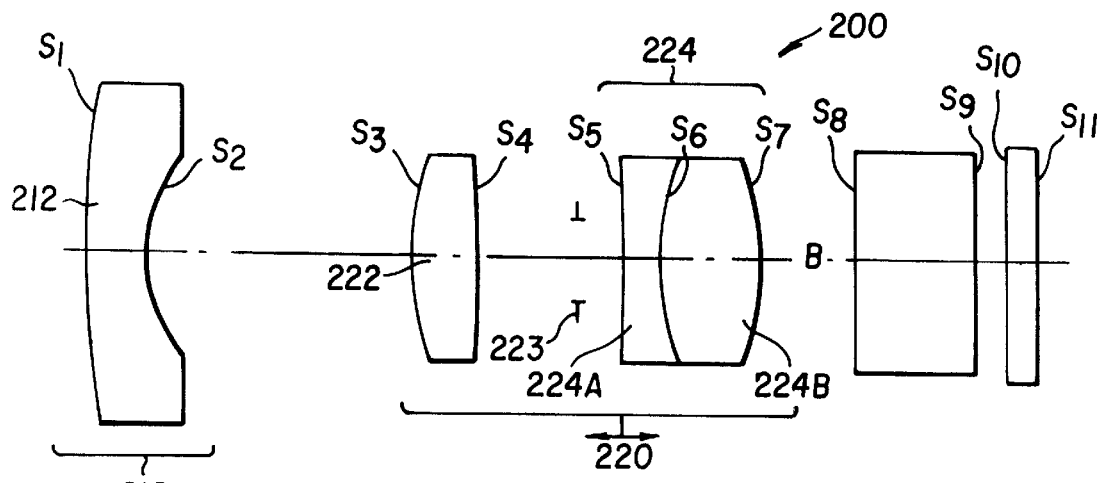
FIG. 2A is a sectional view of a second embodiment of the lens system according to the present invention.
Figure 2B:
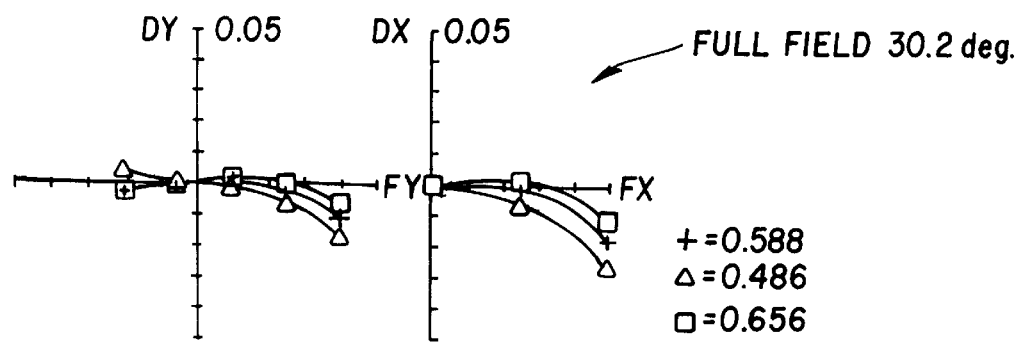
FIGS. 2B–2E are graphical illustrations of the aberrations of the lens system illustrated in FIG. 2A in a wide angle position.
Figure 2C:
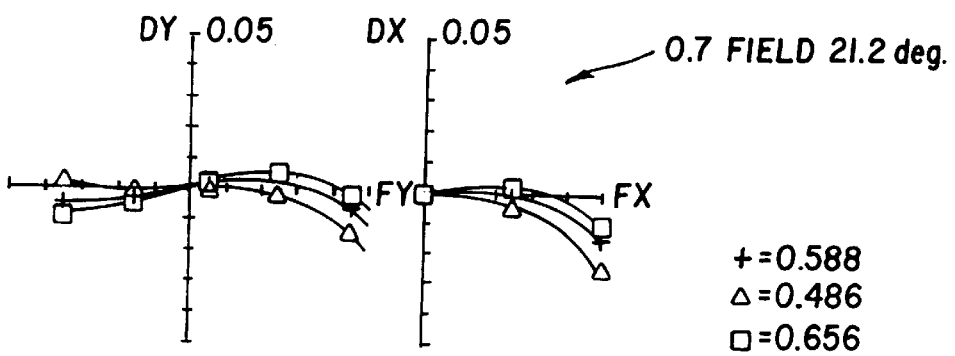
Figure 2D:
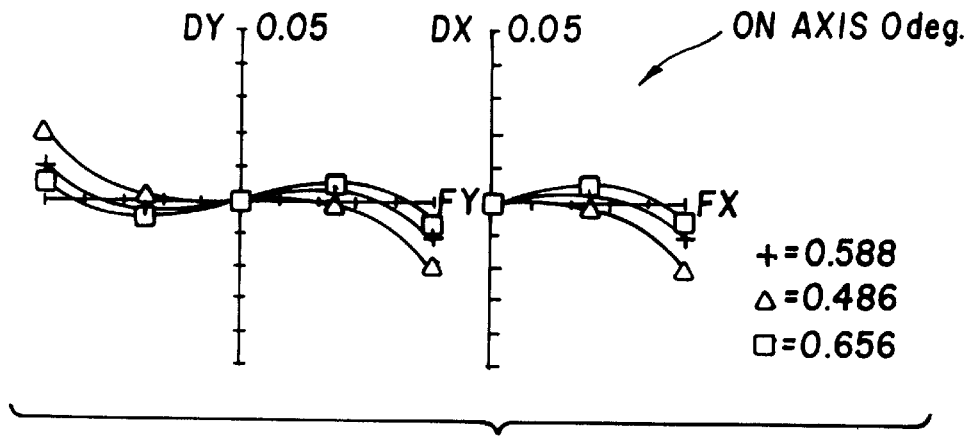
Figure 2E:
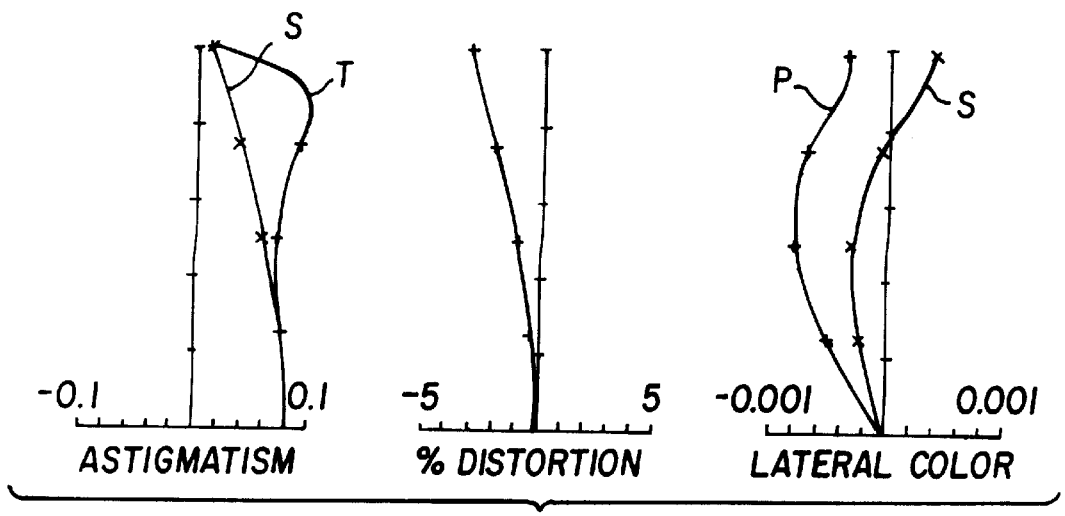
Figure 2F:
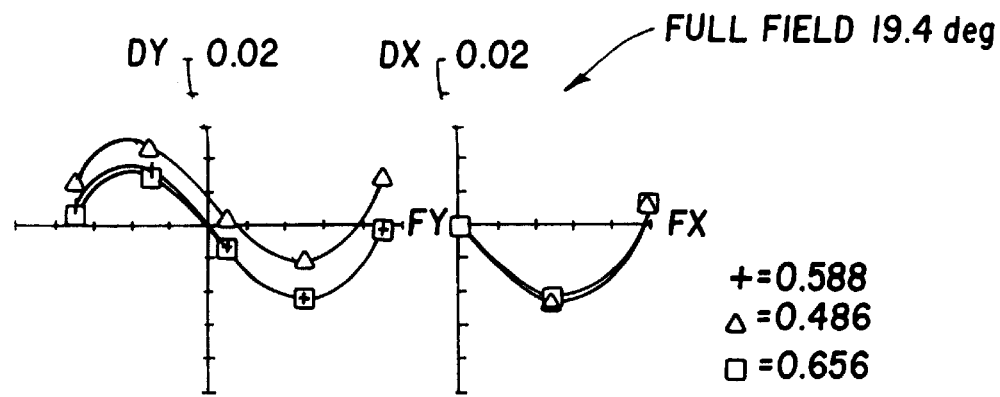
FIGS. 2F–2I are graphical aberrations of the lens system illustrated in FIG. 2A in a telephoto position.
Figure 2G:
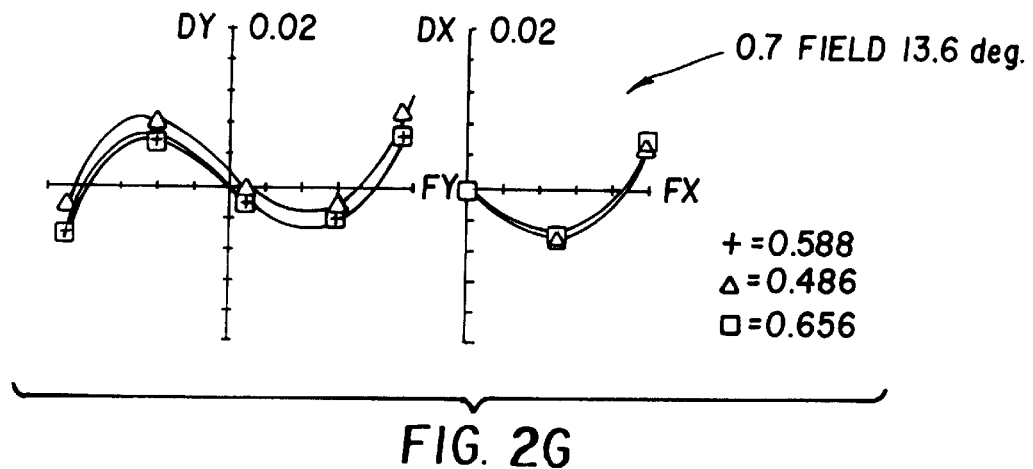
Figure 2H:
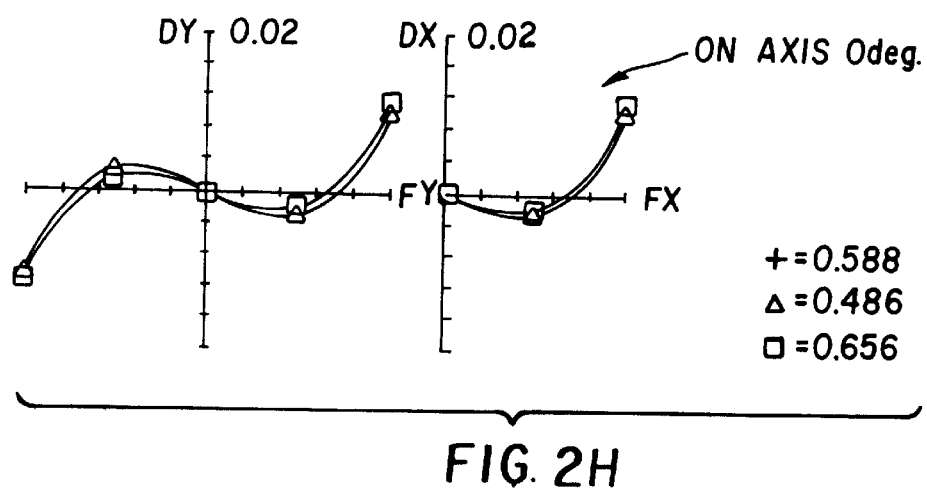
Figure 2I:
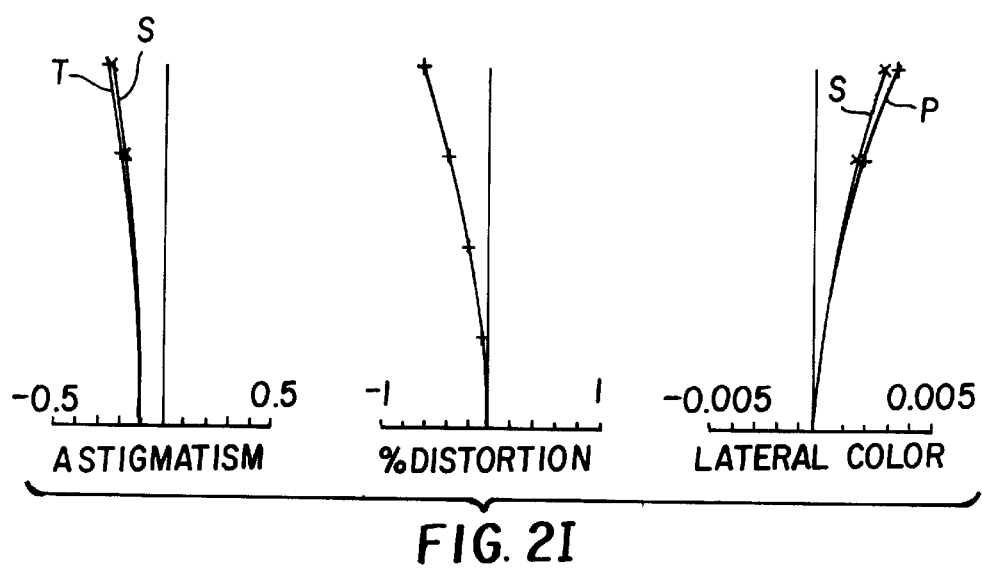

The second embodiment is illustrated in FIG. 2A and its parameters are provided in Table 2A. Table 2B provides its performance characteristics in terms of MTF response. The variable focal length lens system (200) of the second embodiment also consists of two adjacent lens units (210 and 220). The first lens unit (210) is the front most lens unit. The airspace between these two lens units changes during zooming. As in the above described embodiment, a first lens unit (210) consist of a single negative lens component (212) which is single meniscus lens element concave towards the image side. This lens component is made of low dispersion glass (high V number). This helps to control lateral color aberration and eliminates the need for a positive power component in the first lens unit. It also has an aspheric object facing surface S1 that helps to minimize distortion.

The second lens unit (220) includes a first positive power lens component (222), a second positive lens component (224) and an aperture stop (223) located therebetween. The first lens component (222) is a single biconvex lens element. The second lens component (224) is a cemented doublet component. This cemented doublet component includes a negative lens element (224A) and a positive lens element (224B). The negative lens element (224A) has an aspherical surface facing the object side and a concave surface facing the image side. The positive lens element (224B) is an equiconvex lens element. It is the rearmost lens element of the second lens unit (220).

Because the three lens elements of the second lens unit (220) have a plus, minus, plus configuration, they function as a positive triplet. This allows the lens system (200) to achieve a wide angle (full) field coverage of about 62 degrees, a zoom ratio of 1.65 and the F-numbers of F/4.0–F/5.3 with a total of only four lens elements (three lens components) and with only one zooming lens unit. FIGS. 2B–2I provide aberration plots for the lens system (200). They are similar to FIGS. 1B–1I described above.

Figure 3A:
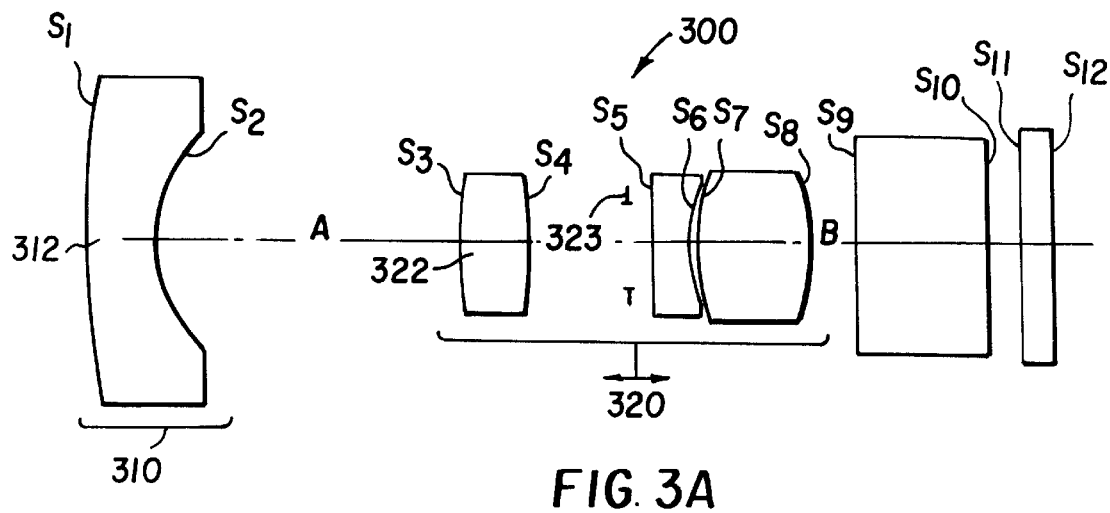
FIG. 3A is a sectional view of a third embodiment of the lens system according to the present invention.
Figure 3B:
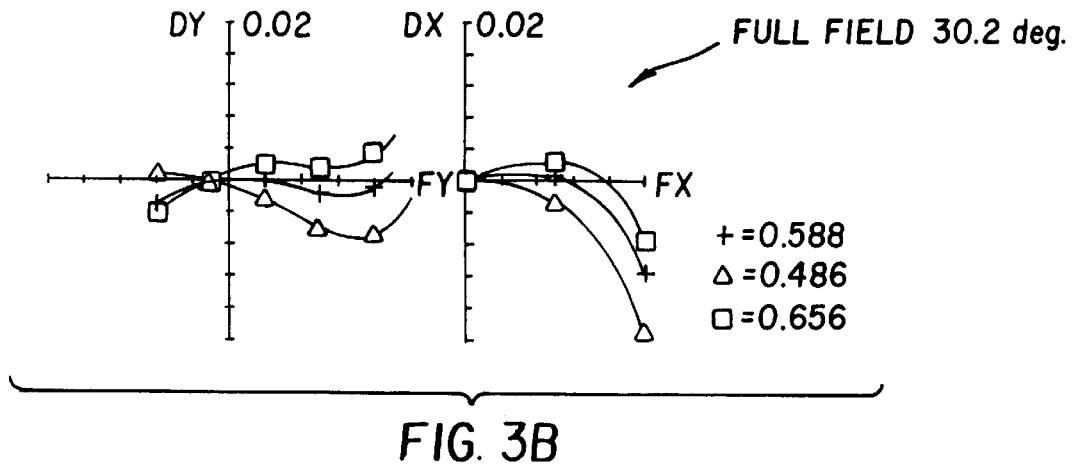
FIGS. 3B–3E are graphical illustrations of the aberrations of the lens system illustrated in FIG. 3A in a wide angle position.
Figure 3C:
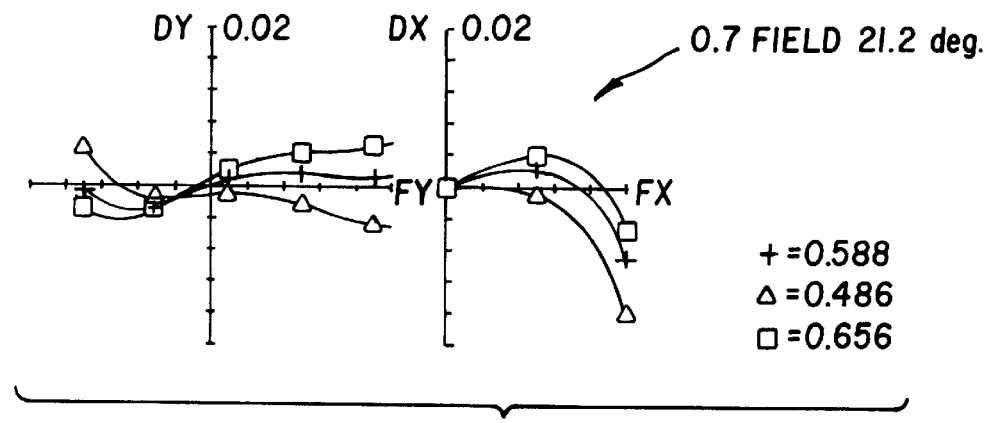
Figure 3D:
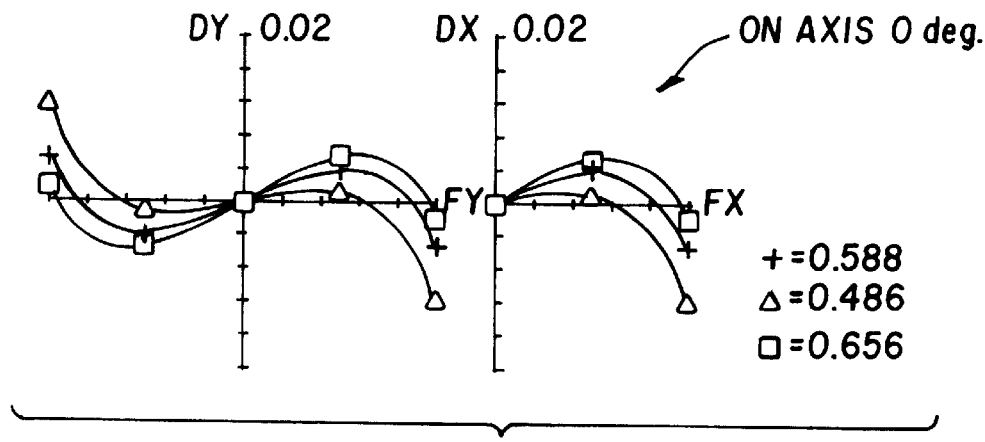
Figure 3E:
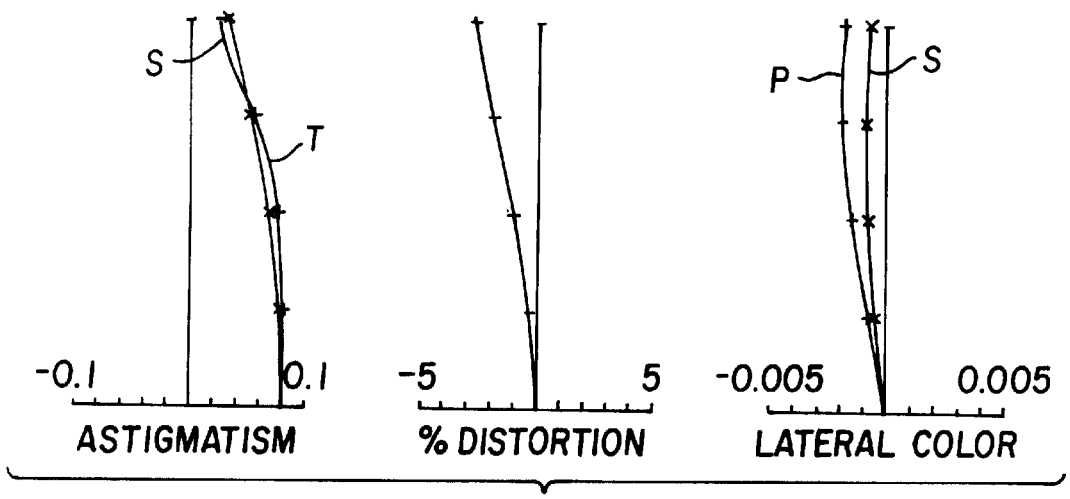
Figure 3F:
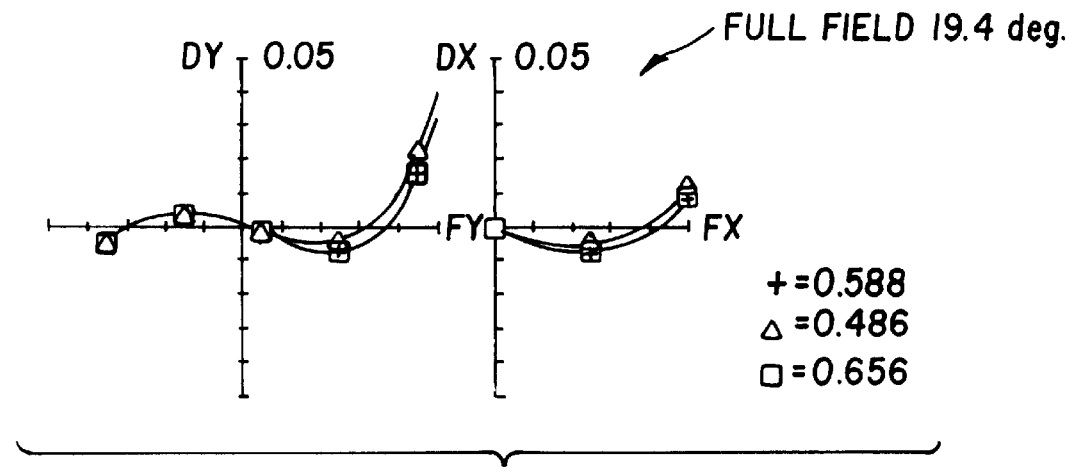
FIGS. 3F–3I are graphical aberrations of the lens system illustrated in FIG. 3A in a telephoto position.
Figure 3G:
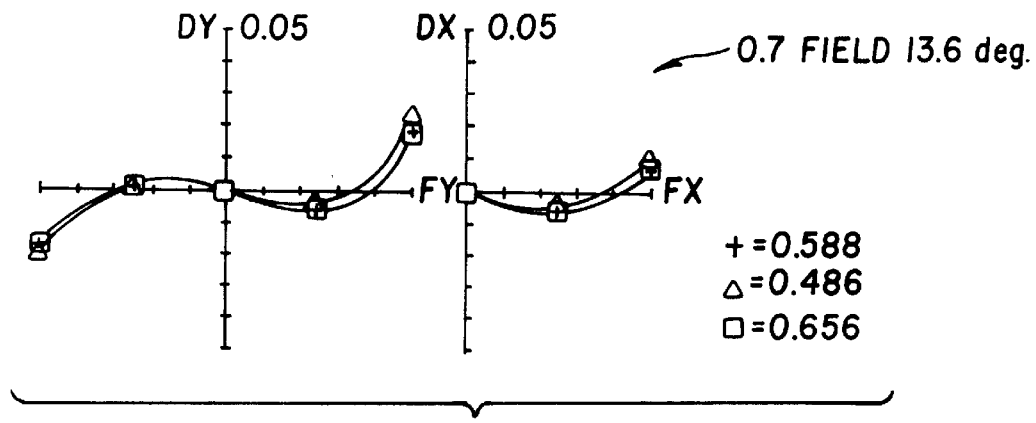
Figure 3H:
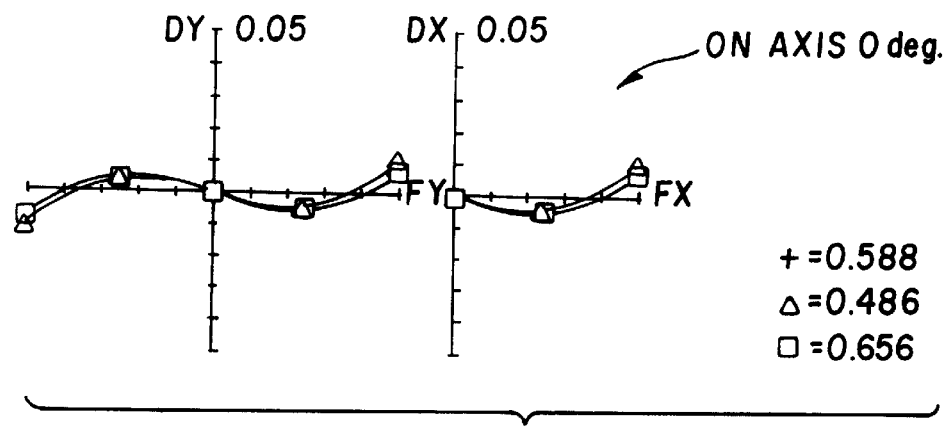
Figure 3I:
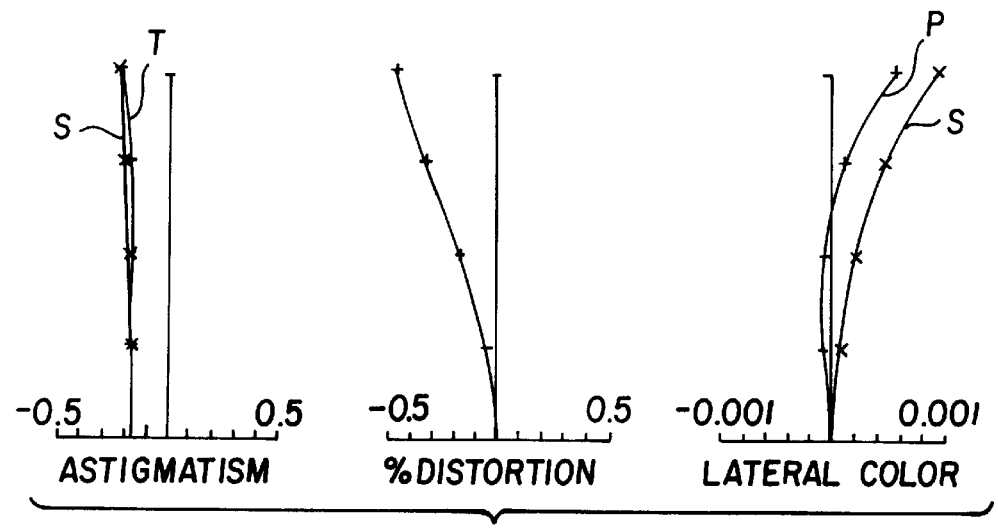
Figure 4A:
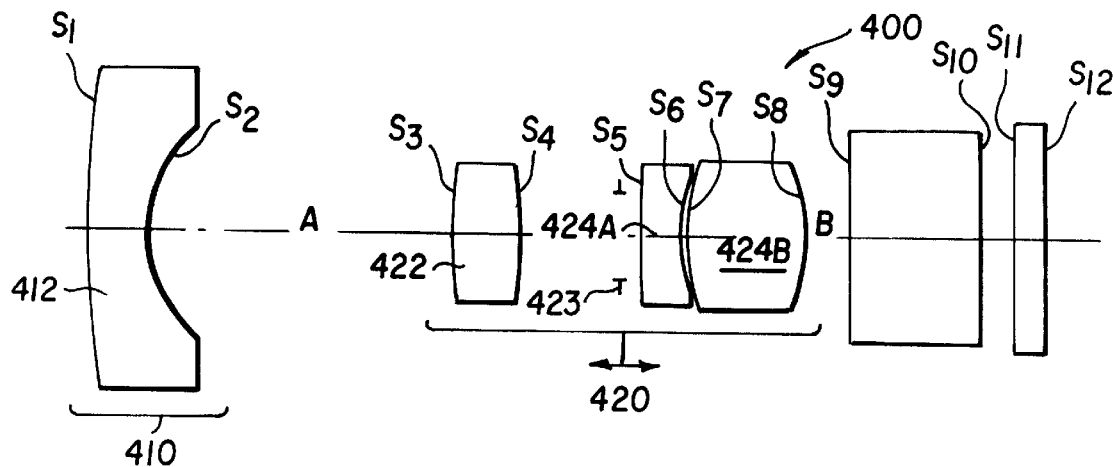
FIG. 4A is a sectional view of a fourth embodiment of the lens system according to the present invention.
Figure 4B:
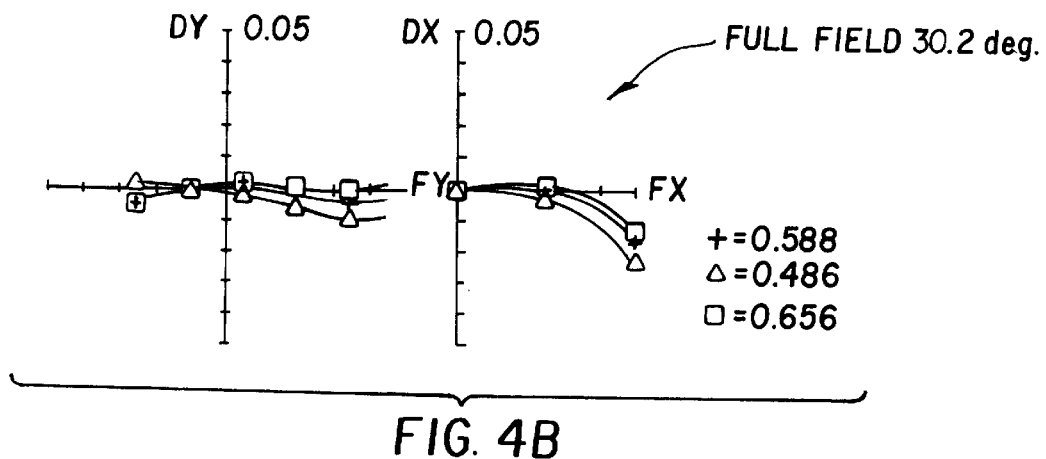
FIGS. 4B–4E are graphical illustrations of the aberrations of the lens system illustrated in FIG. 4A in a wide angle position.
Figure 4C:
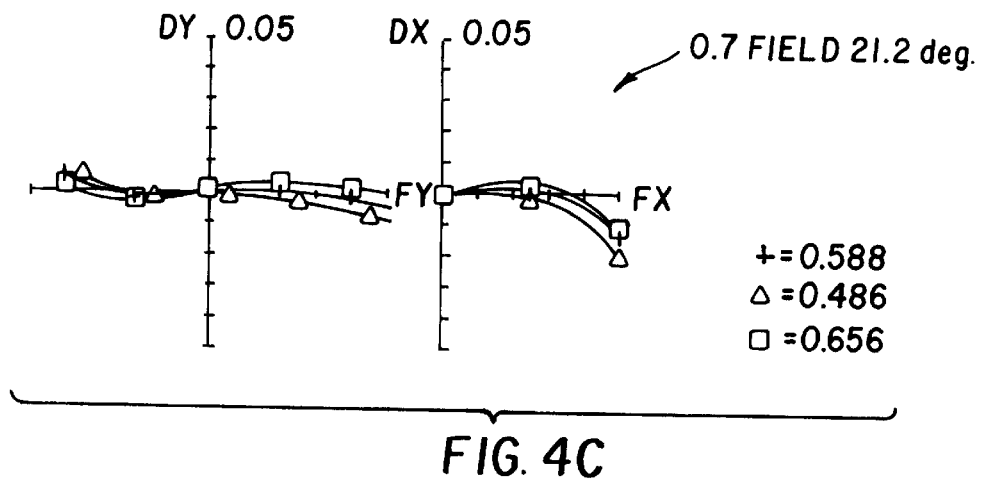
Figure 4D:
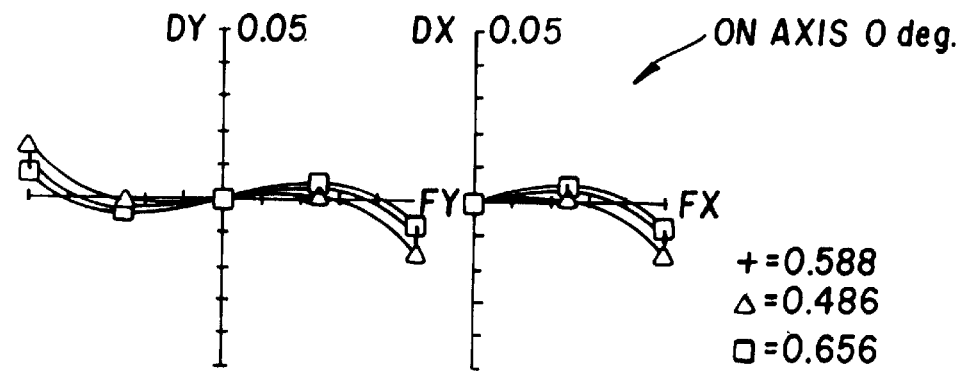
Figure 4E:
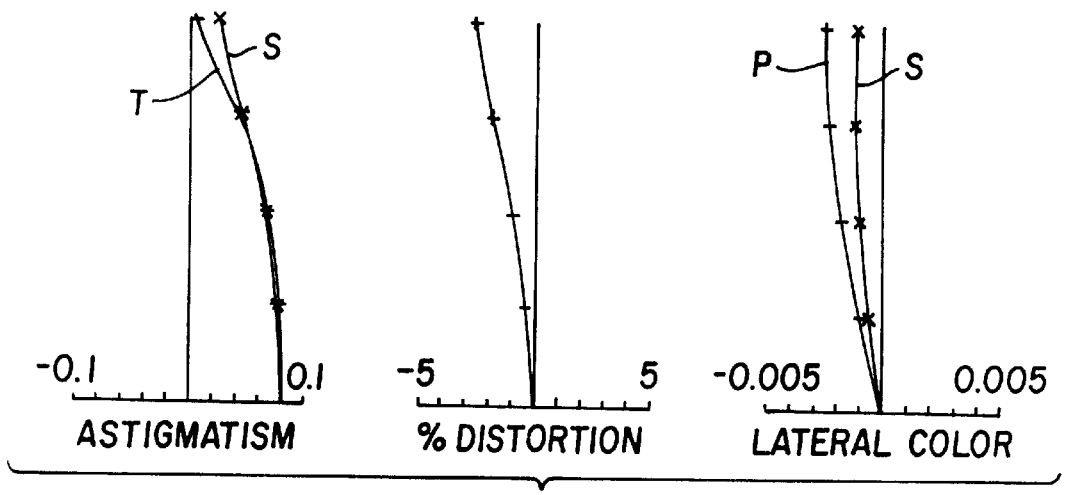
Figure 4F:
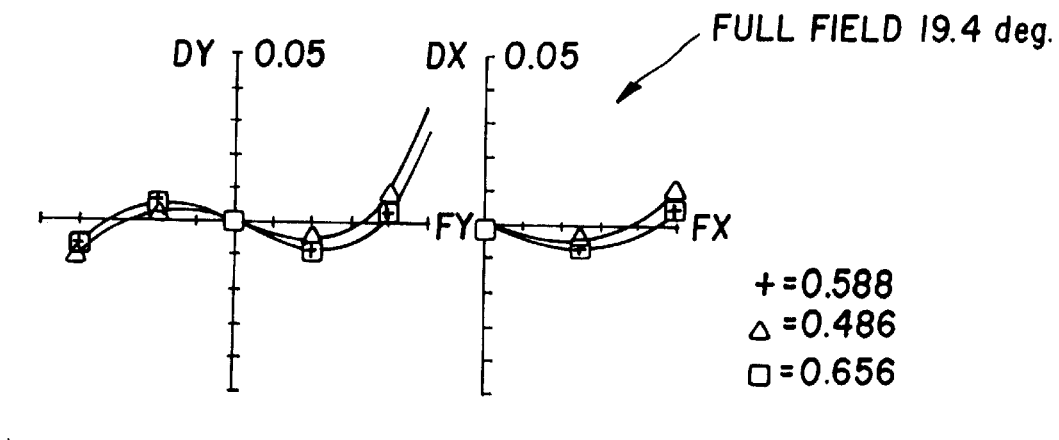
FIGS. 4F–4I are graphical aberrations of the lens system illustrated in FIG. 4A in a telephoto position.
Figure 4G:
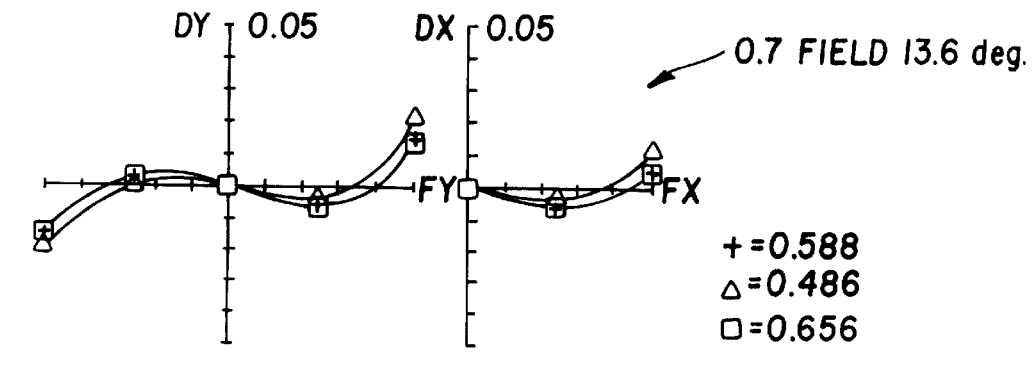
Figure 4H:
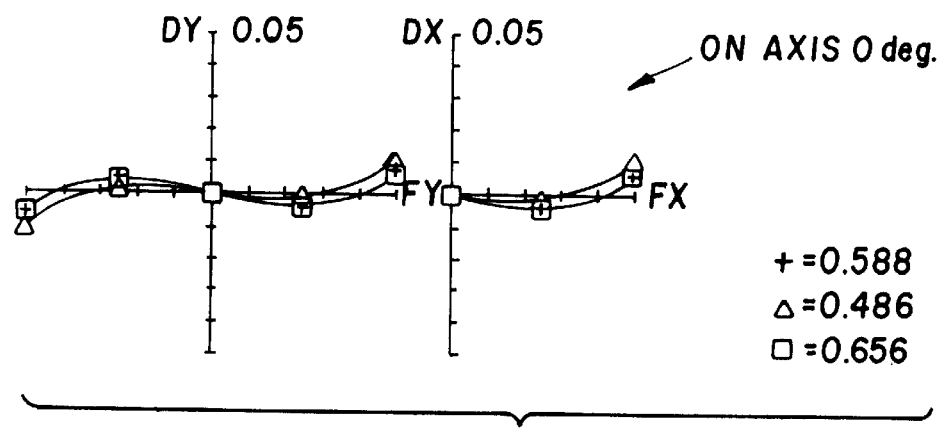
Figure 4I:
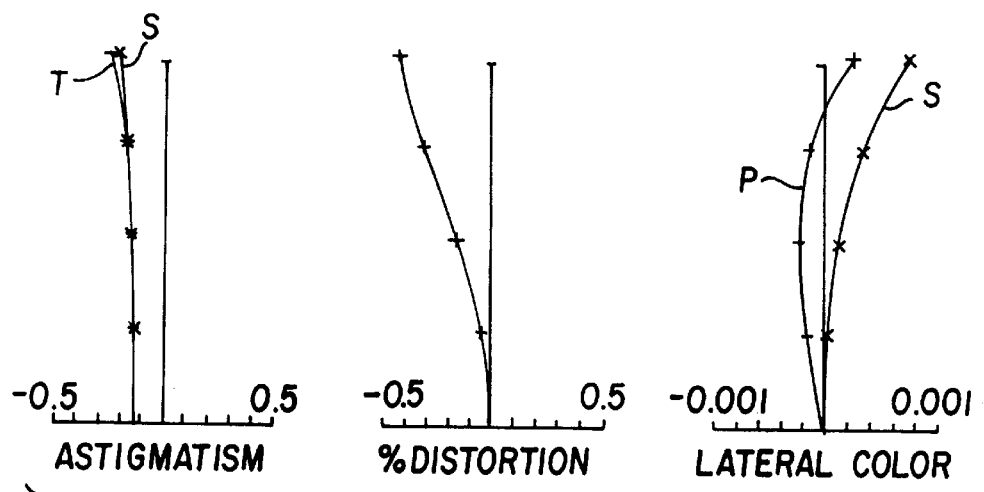
Figure 5A:
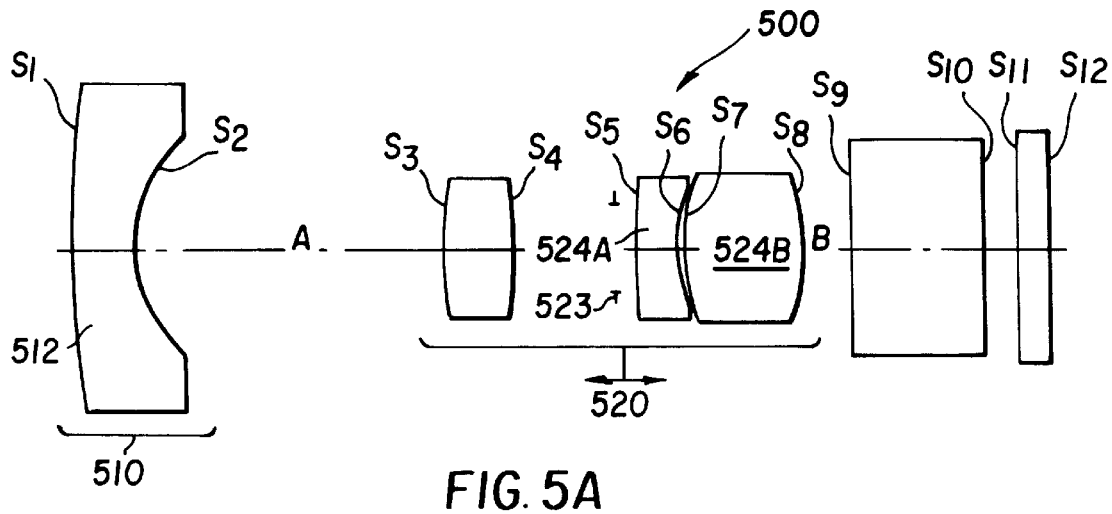
FIG. 5A is a sectional view of a fifth embodiment of the lens system according to the present invention.
Figure 5B:
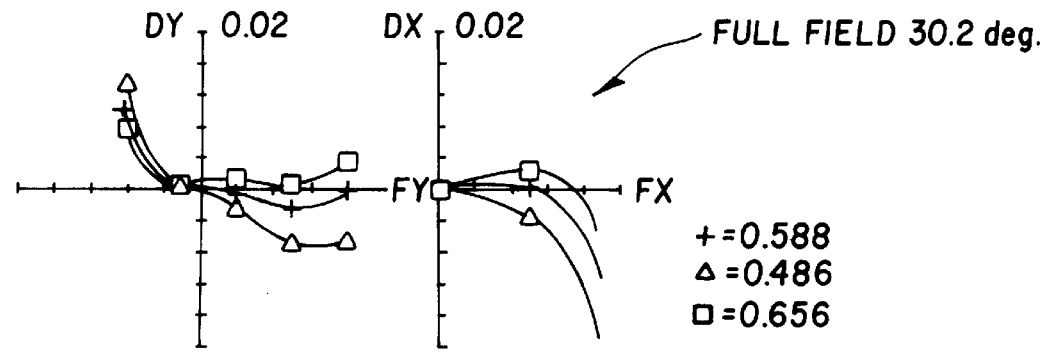
FIGS. 5B–5E are graphical illustrations of the aberrations of the lens system illustrated in FIG. 5A in a wide angle position.
Figure 5C:
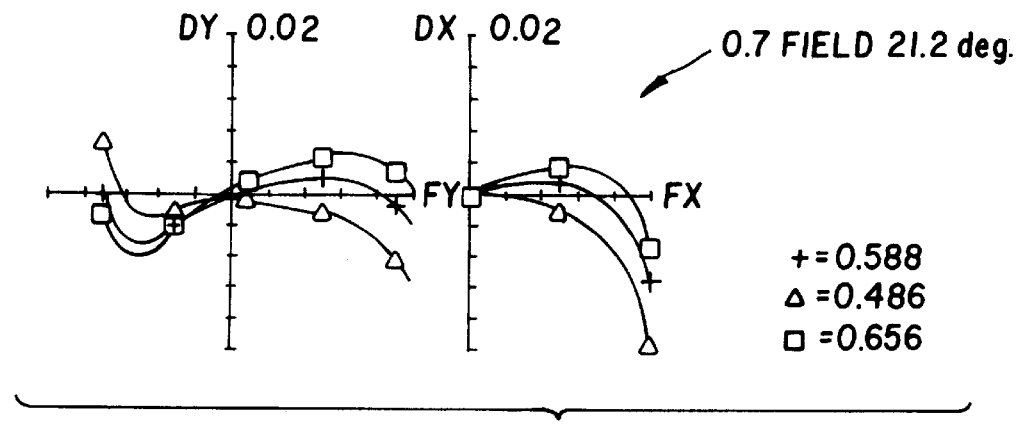
Figure 5D:
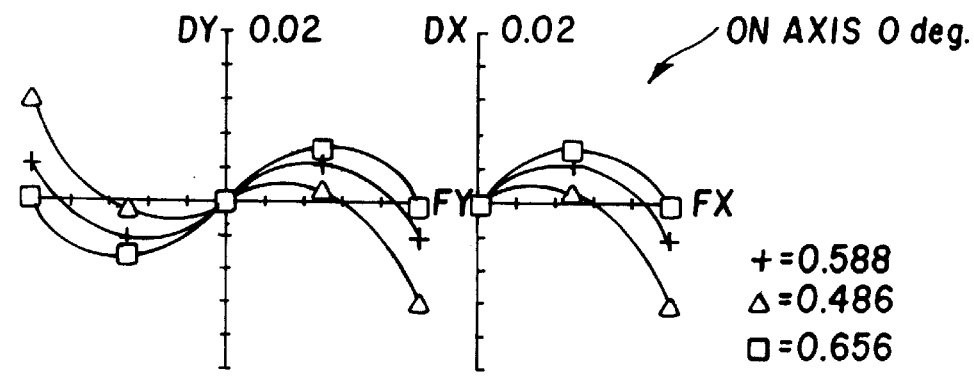
Figure 5E:
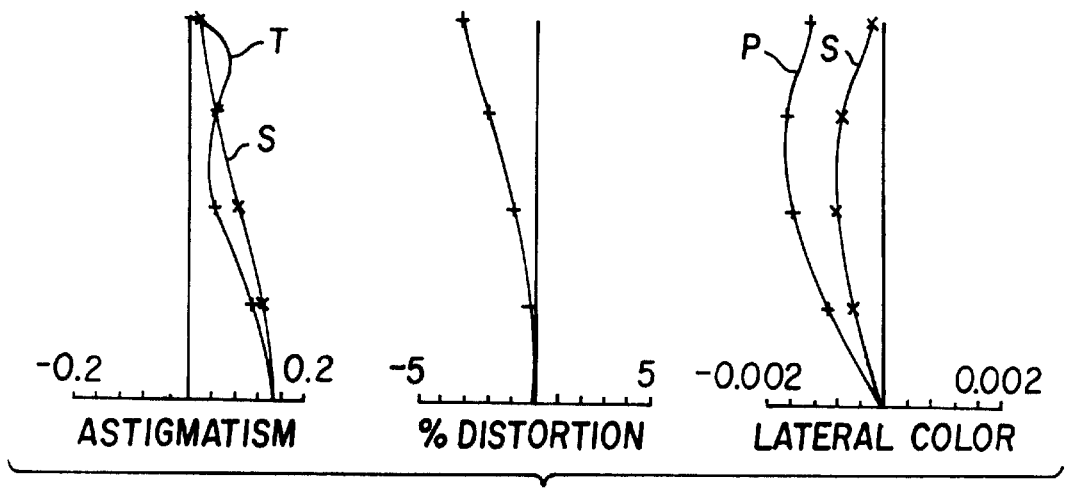
Figure 5F:
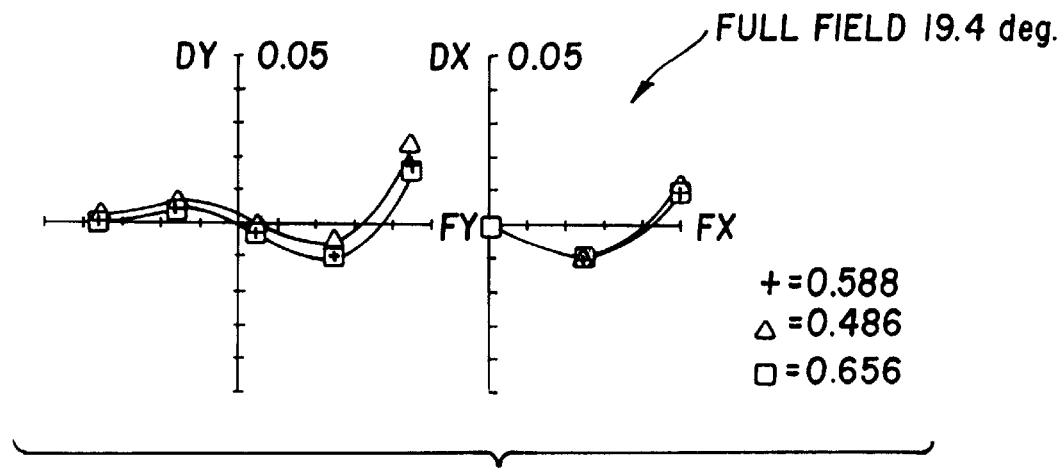
FIGS. 5F–5I are graphical aberrations of the lens system illustrated in FIG. 5A in a telephoto position.
Figure 5G:
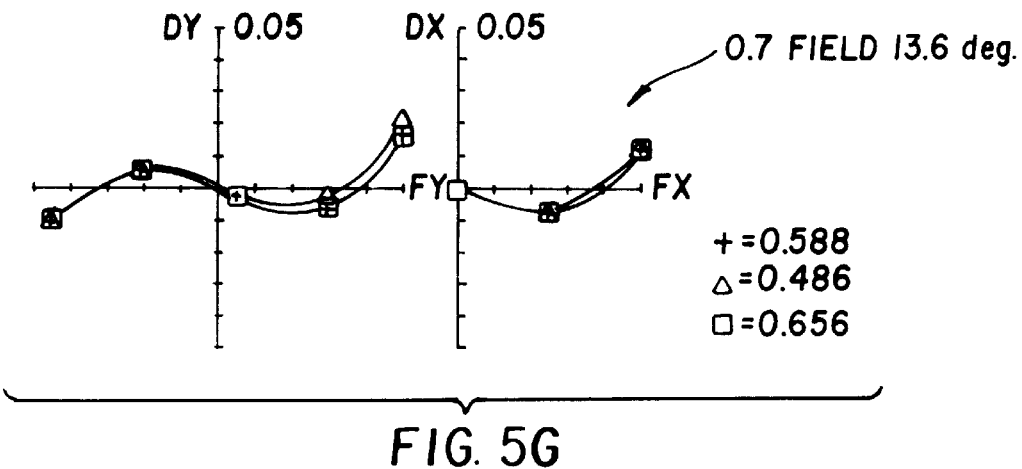
Figure 5H:
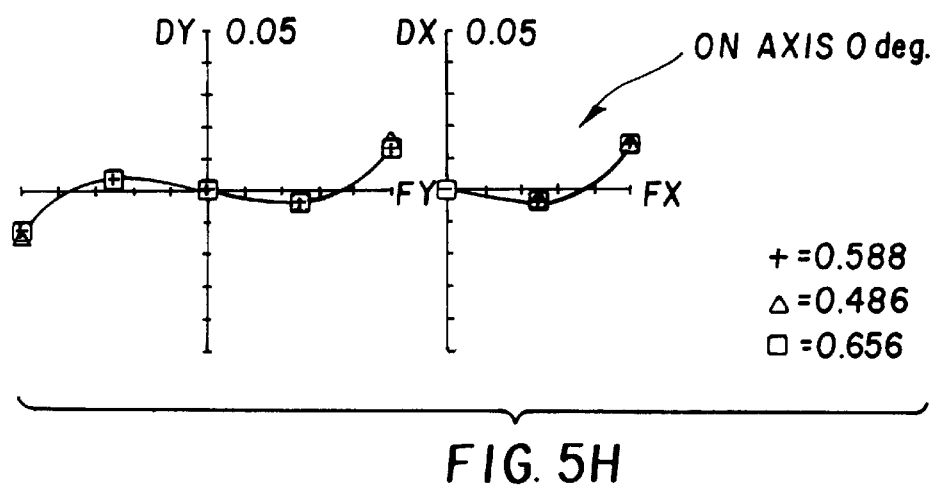
Figure 5I:
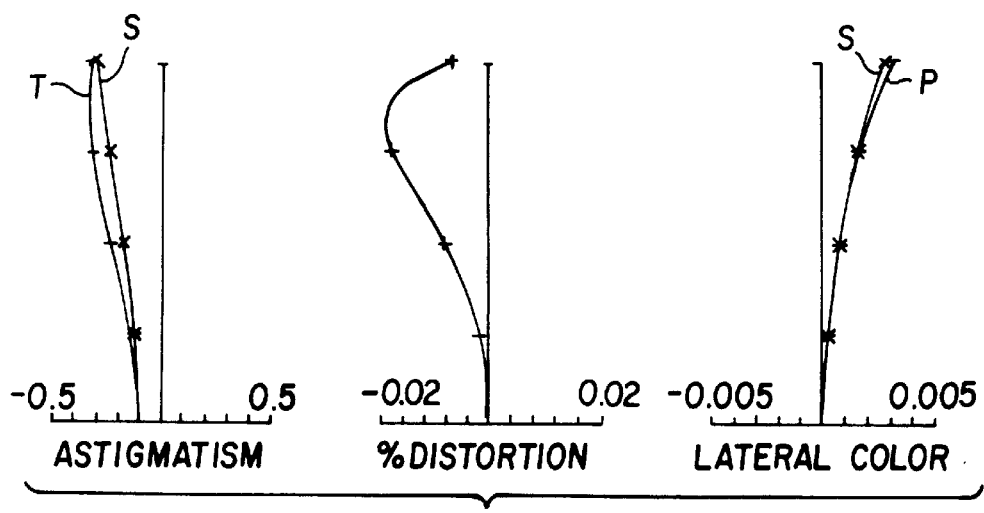

The third, fourth and fifth embodiments are illustrated in FIGS. 3A, 4A, an 5A and their parameters are provided in Tables 3A, 4A and 5A. Tables 3B, 4B and 5B provides their performance characteristics in terms of MTF response. These embodiments have configurations that are very similar to that of the second embodiment illustrated above. However, the negative lens element (324A) and the rearmost positive lens element (324B) of the second lens unit (320) are airspaced from one another and are therefore uncemented. This airspace distance is less than a thickness of the negative lens element (324A). In addition, both the first lens components (322, 422 and 422) and the rear most lens elements (324B, 424B and 524B) comprising the second lens unit of the lens systems (300, 400, 500) are equiconvex and have symmetrical surface shapes. The equations and parameters for these lens elements and lens components are provided in the above mentioned Tables 3B, 4B and 5B. FIGS. 3B–3I, 4B–4I and 5B–5I provide detail the performance of the verifocal lens systems 300, 400 and 500, respectively.

The invention has been described in detail with particular reference to a preferred embodiment thereof, but it will be understood that variations and modifications can be effected within the spirit and scope of the invention. For example, such modification can include but not limited to an introduction of a lens element which does not materially affect the third order aberrations of the variable focal length lens system, or addition, or removal of planar transparent elements having no significant optical refractive power (i.e. its powers is less than 5% of the $1/f_T$, where $f_T$ is the focal length of the lens system in the wide angle mode). Furthermore, planar transparent elements having no optical refractive power (such as elements 126, 128, 226, 228, 326, 328, 426, 428, 526, 528) are not to be considered lens elements, lens components, lens units or lens subunits.

What is claimed is:

1. A variable focal length lens system comprising: two adjacent lens units, one stationary, the other movable, said lens units being in order from an object side towards an image side (i) a first lens unit possessing divergent refractive power, said first lens unit being the front most lens unit and consisting of a single negative lens component; and (ii) a movable second lens unit possessing convergent refractive power, said second lens unit consisting of two positive power lens components and an aperture stop.

2. A variable focal length lens system according to claim 1 wherein and said aperture stop is located between said two positive lens components of said second lens unit.

3. A variable focal length lens system according to claim 2 wherein said single negative lens component of said first lens unit is a meniscus lens component with a concave surface facing the image side.

4. A variable focal length lens system according to claim 2 wherein said single negative lens component of said first lens unit has an aspheric surface and an Abbe V-number greater than 50.

5. A variable focal length lens system comprising: two adjacent lens units, said lens units being in order from an object side towards an image side
    (i) a stationary first lens unit possessing divergent refractive power, said first lens unit being the front most lens unit and consisting of a single negative lens component with a concave surface facing the image side; and
    (ii) a movable second lens unit possessing convergent refractive power, said second lens unit being the rear most lens unit, said second lens unit including in order from the object side towards the image side, a first positive lens element, an aperture stop, and a second positive lens element.

6. A variable focal length lens system according to claim 5 further including at least one aspheric surface in each of the lens units.

7. A variable focal length lens system according to claim 5, wherein one of said positive power lens elements of said second lens unit has a diffractive surface.

8. A variable focal length lens system according to claim 7, having at least one aspheric surface in each of said lens units.

9. A variable focal length lens system according to claim 8, wherein the other of said positive lens elements of the second lens unit is equiconvex.

10. A variable focal length lens system according to claim 9 wherein the equiconvex lens element is biaspheric and symmetric.

11. A variable focal length lens system according to claim 7, wherein said first positive lens element is an equiconvex lens element, and said positive lens element with the diffractive surface is the second positive lens element, and said diffractive surface faces the aperture stop.

12. A variable focal length lens system according to claim 11, having at least one aspheric surface in each of said lens units.

13. A variable focal length lens system according to claim 12 wherein said first positive lens element of said second lens unit has two surfaces having an identical surface shape.

14. A variable focal length lens system according to claim 5 further including a negative lens element in said second lens unit.

15. A variable focal length lens system according to claim 14 further including at least one aspheric surface in each of the lens units.

16. A variable focal length system according to claim 14, wherein said single negative lens component of said first lens unit has a V-number of greater than 50.

17. A variable focal length lens system according to claim 14 wherein said negative lens element of said second lens unit is cemented to one of said positive lens elements.

18. A variable focal length lens system according to claim 15 wherein said negative lens element of said second lens unit is cemented to said second positive lens element.

19. A variable focal length lens system according to claim 16 further including at least one aspheric surface in each of the lens units.

20. A variable focal length lens system according to claim 17 wherein at least one of said positive elements is equiconvex.

21. A variable focal length lens system according to claim 18 wherein at least one of said positive elements is equiconvex.

22. A variable focal length lens system according to claim 21 wherein said negative lens element of said second lens unit has an aspheric surface.

23. A variable focal length lens system according to claim 14 wherein said negative lens element has a thickness and is airspaced from the nearest positive lens element by a distance smaller than said thickness.

24. A variable focal length lens system according to claim 23 further including at least one aspheric surface in each of the lens units.

25. A variable focal length lens system according to claim 23 wherein one of said positive lens elements is equiconvex.

26. A variable focal length lens system according to claim 24 wherein one of said positive lens elements is equiconvex.

27. A variable focal length lens system according to claim 24 wherein each of said positive lens elements is equiconvex.

28. A variable focal length lens system according to claim 27 wherein one of said equiconvex lens elements is biaspheric and has two identical surfaces.

29. An optical system comprising:
    (i) a variable focal length lens system according to claim 5, and
    (ii) other components made of optically transparent materials, said other components having essentially no optical power.

30. A variable focal length lens system consisting: two lens units, each of said units having at least one aspherical surface, said lens units being in arranged in order from an object side towards an image side
    (i) a first lens unit possessing divergent refractive power, said first lens unit consisting of a single negative lens component with a concave surface facing the image side, and having at least one aspheric surface; and
    (ii) a second lens unit, movable for zooming and possessing convergent refractive power, said second lens unit including in order from the object side towards the image side, a first equiconvex lens element, an aperture stop, and a second positive lens element with a diffractive surface.

31. A variable focal length lens system consisting: two lens units, each of said units having at least one aspherical surface, said lens units being in order from an object side towards an image side
    (i) a first lens unit, said first lens unit possessing divergent refractive power, said first lens unit consisting of a single negative lens component with a concave surface facing the image side and having at least one aspheric surface; and
    (ii) a second lens unit, said second lens unit being movable for zooming and possessing convergent refractive power, said second lens unit including in order from the object side towards the image side, a first equiconvex positive lens element, an aperture stop, a negative lens element and a second equiconvex positive lens element.

32. A variable focal length lens system consisting: two lens units, each of said units having at least one aspherical surface, said lens units being in order from an object side towards an image side (i) a first lens unit, said first lens unit possessing divergent refractive power, said first lens unit consisting of a single negative lens component with a concave surface facing the image side and having at least one aspheric surface, and (ii) a second lens unit movable for zooming and possessing convergent refractive power, said second lens unit including in order from the object side towards the image side, a first positive lens element, an aperture stop, and a negative lens element cemented to a second positive lens element, wherein said second positive lens element is equiconvex.

33. A variable focal length lens system comprising: two adjacent lens units, one stationary, the other movable, said lens units being in order from an object side towards an image side;

a first lens unit possessing divergent refractive power, said first lens unit being the front most lens unit and consisting of a single negative lens component, said single negative lens component being a meniscus lens component that has (i) a concave surface facing the image side, (ii) an aspheric surface, and (iii) an Abbe V-number greater than 50; and a movable second lens unit possessing convergent refractive power, said movable second lens unit consisting of two positive power lens components and an aperture stop located between said two positive lens components.

* * * * *